2,919,289
Patented Dec. 29, 1959

2,919,289

METHOD OF SYNTHESIS OF DIALKYL ALPHA-KETOGLUTARATE FROM ALKYL 2,5-DIALK-OXY-2,5-DIHYDRO-2-FUROATE

Masuo Murakami and Saburo Senoh, Kobe-shi, Hyogo-ken, Japan

No Drawing. Application May 22, 1956
Serial No. 586,372

Claims priority, application Japan June 25, 1955

5 Claims. (Cl. 260—483)

The invention described herein pertains to a new method of synthesis of dialkyl alpha-ketoglutarate in high yields. According to the invention, this compound is prepared by cleaving the furan nucleus of an alkyl 2,5-dialkoxy-2,5-dihydro-2-furoate, by treatment with an alcohol and a hydrogen halide.

The object of the said invention is to obtain from furfural, which is commercially readily available material, a dialkyl alpha-ketoglutarate with ease and in high yields. The latter compound is used as a starting substance for the preparation of glutamic acid and various other useful products.

It has been made public that the alkyl 2,5-dialkoxy-2,5-dihydro-2-furoate can be prepared from furfural which is a readily available commercial raw material but it has not hitherto been known that the dialkyl alpha-ketoglutarate which is utilized for manufacturing glutamic acid and various other commercially useful substances can be synthesized from the dialkyl 2,5-dialkoxy-2,5-dihydro-2-furoate. This synthesis has been successfully achieved in accordance with the present invention and its outstanding features are that furfural, the raw material, is readily available commercially in a large quantity and that glutamic acid can be manufactured readily with high yields through less complicated manufacturing processes involving simple chemical reactions.

Previously, N. Clauson-Kaas and F. Limborg, Acta Chem. Scand., 6, 551 (1952), have synthesized methyl 2,5-dimethoxy-2,5-dihydro-2-furoate from methyl 2-furoate by electrolytic oxidation.

According to the said invention, the alkyl 2-furoate which can be prepared by known methods is converted to the alkyl 2,5-dialkoxy-2,5-dihydro-2-furoate by the application of, for instance, the reaction mentioned above or of any other chosen method. The derived compound is allowed to stand in alcohol which has been saturated with hydrogen chloride gas at room temperature, the mixture heated under reflux for a few hours or heated for a short time under pressure in the hydrogen chloride gas saturated alcohol, and the residue obtained after removing the solvent by distillation is distilled to give the dialkyl alpha-ketoglutarate in a yield of over 70% of the theory. The product thus obtained is identified by the fact that its elementary analysis agrees closely with the calculated values and also that its infrared spectra with that of an authentic sample (refer to L. Friedman and E. Kosower, Organic Syntheses, vol. 26, p. 42 (1946); W. Wislisenus and M. Waldmüller, Ber., 44, 1564 (1911)).

A few examples of the methods of preparations involved in the said invention are as follows:

Example 1

Ethyl 2-furoate in absolute ethanol is converted to ethyl 2,5-diethoxy-2,5-dihydro-2-furoate, B.P. 128–131° C./11 mm., $n_D^{22.8}$ 1.4384, $d_4^{22.8}$ 1.0589, in 63% of the theoretical yield by the electrolytic oxidation method of N. Clauson-Kaas, a mixture of this compound and ethanol saturated with dry hydrogen chloride gas in a volume several times that of the compound is refluxed on the water bath for a few hours, the solvent removed by distillation, and the residue distilled under reduced pressure. The distilled product, diethyl alpha-ketoglutarate ($C_9H_{14}O_5$), B.P. 118–122° C./5 mm.; lambda max. 5.79 microns (ester) is obtained in a yield of over 70% of the theoretical amount and the results of its elementary analysis are as follows:

| | C (Percent) | H (Percent) |
|---|---|---|
| Anal.: | | |
| Calc'd for $C_9H_{14}O_5$ | 53.46 | 6.98 |
| Found | 53.31 | 7.26 |

Dimethyl-alpha-ketoglutarate can be obtained in high yields by treating methyl 2,5-dimethoxy-2,5-dihydro-2-furoate in methanol saturated with dry hydrogen chloride gas in the same manner as described above.

Example 2

Ethyl 2,5-diethoxy-2,5-dihydro-2-furoate as given above is allowed to stand at room temperature with ethanol saturated with dry hydrogen chloride gas, the reaction mixture resulted is added to a solution of 2,4-dinitrophenylhydrazine sulfate in ethanol, and the crystalline product obtained on recrystallization from ethanol shows M.P. 87–89° C., diethyl alpha-ketoglutarate 2,4-dinitrophenylhydrazone ($C_{15}H_{18}O_8N_4$). The analytical results of this new compound are as follows:

| | C (Percent) | H (Percent) | N (Percent) |
|---|---|---|---|
| Anal.: | | | |
| Calc'd for $C_{15}H_{18}O_8N_4$ | 47.12 | 4.75 | 14.66 |
| Found | 47.27 | 4.88 | 14.09 |

If methanol is used in place of ethanol, a new compound ethyl methyl alpha-ketoglutarate 2,4-dinitrophenylhydrazone ($C_{14}H_{16}O_8N_4$) is obtained. Its M.P. is 114–117° C. and analytical results are as follows:

| | C (Percent) | H (Percent) | N (Percent) |
|---|---|---|---|
| Anal.: | | | |
| Calc'd for $C_{14}H_{16}O_8N_4$ | 45.65 | 4.38 | 15.21 |
| Found | 45.56 | 4.10 | 15.14 |

Example 3

A mixture of 0.50 g. of diethyl alpha-ketoglutarate obtained as the main fraction of the distillate, as given in the Example 1, and 3.00 cc. of 6 N hydrochloric acid is refluxed for one hour and to it is added a solution of 0.54 g. of 2,4-dinitrophenylhydrazine in 270 cc. of 2 N hydrochloric acid. On standing the reaction mixture there is obtained 0.65 g. of a yellow crystalline product, which on recrystallization from water shows M.P. 209–210° C. (dec.). It is identified to be alpha-ketoglutaric acid 2,4-dinitrophenylhydrazone ($C_{11}H_{10}O_8N_4$) and its analytical results are as follows:

| | C (Percent) | H (Percent) | N (Percent) |
|---|---|---|---|
| Anal.: | | | |
| Calc'd for $C_{11}H_{10}O_8N_4$ | 40.50 | 3.09 | 17.18 |
| Found | 40.81 | 3.24 | 16.78 |

Since it is possible to see variations of the methods given in the examples as well as various others complying with the feature and principle of the said invention, the said invention, of course, would not be restricted by any other minor changes of the procedures given in the above mentioned examples as long as changes used remain within the scope of the claims stated herein.

What we claim is:

1. A method for the production of a lower dialkyl-alpha-ketoglutarate which comprises reacting a lower alkyl 2,5-lower dialkyloxy-2,5-dihydro-2-furoate with a lower alkanol and anhydrous hydrogen chloride gas.

2. A method for the production of a lower dialkyl alpha-ketoglutarate which comprises reacting a lower alkyl 2,5 lower dialkyloxy 2,5-dihydro-2-furoate with a lower alkanol and dry hydrogen chloride gas and allowing the mixture to stand at room temperature.

3. A method for the production of a lower dialkyl-alpha-ketoglutarate which comprises heating a lower alkyl 2,5 lower dialkyloxy 2,5-dihydro-2-furoate with a lower alkanol and anhydrous hydrogen chloride gas to the boiling point of the alkanol under atmospheric pressure.

4. A method for the production of a lower dialkyl-alpha-ketoglutarate which comprises reacting a lower alkyl 2,5 lower dialkyloxy 2,5-dihydro-2-furoate with an excess of a lower alkanol containing substantially anhydrous hydrogen chloride gas, the excess alkanol acting as a solvent.

5. A method for the production of a lower dialkyl-alpha-ketoglutarate, which comprises reacting a lower alkyl 2,5 lower dialkyloxy 2,5-dihydro-2-furoate with a lower alkanol saturated with dry hydrogen chloride gas.

References Cited in the file of this patent

UNITED STATES PATENTS

| | | |
|---|---|---|
| 2,436,532 | Singleton | Feb. 28, 1948 |
| 2,475,097 | Jones | July 5, 1949 |
| 2,515,304 | Jones | July 18, 1950 |

OTHER REFERENCES

Dunlop et al.: "The Furans" (1953), pp. 390–1, 496.

Hachihama et al.: Chem. Abs. 50, 12015a (1956), J. Chem. Soc. Japan, Ind. Chem., sect. 58, 806 (1955).

Murakami et al.: Chem. Abs. 51, 5745–5747 (1957), Mem. Inst. Sci. Ind. Research, Osaka Univ. 13, 173–183 (1956).